June 26, 1951  L. S. WILLIAMS  2,558,162
PENDULUM WEIGHING SCALE WITH TARE SETTING MEANS
Filed April 6, 1949  2 Sheets-Sheet 1
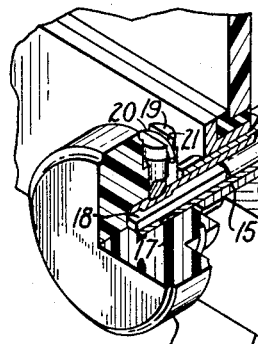
Fig. II
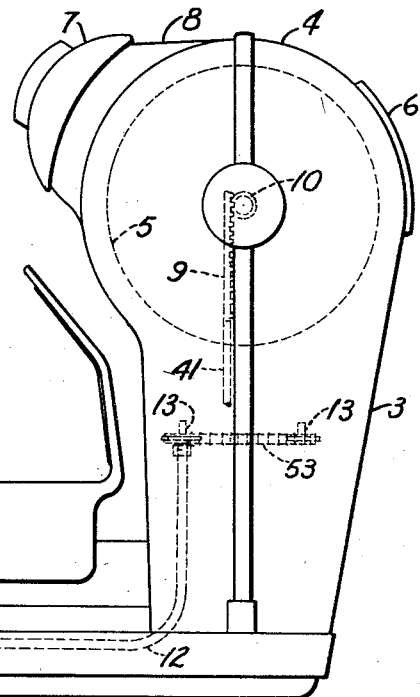
Fig. I
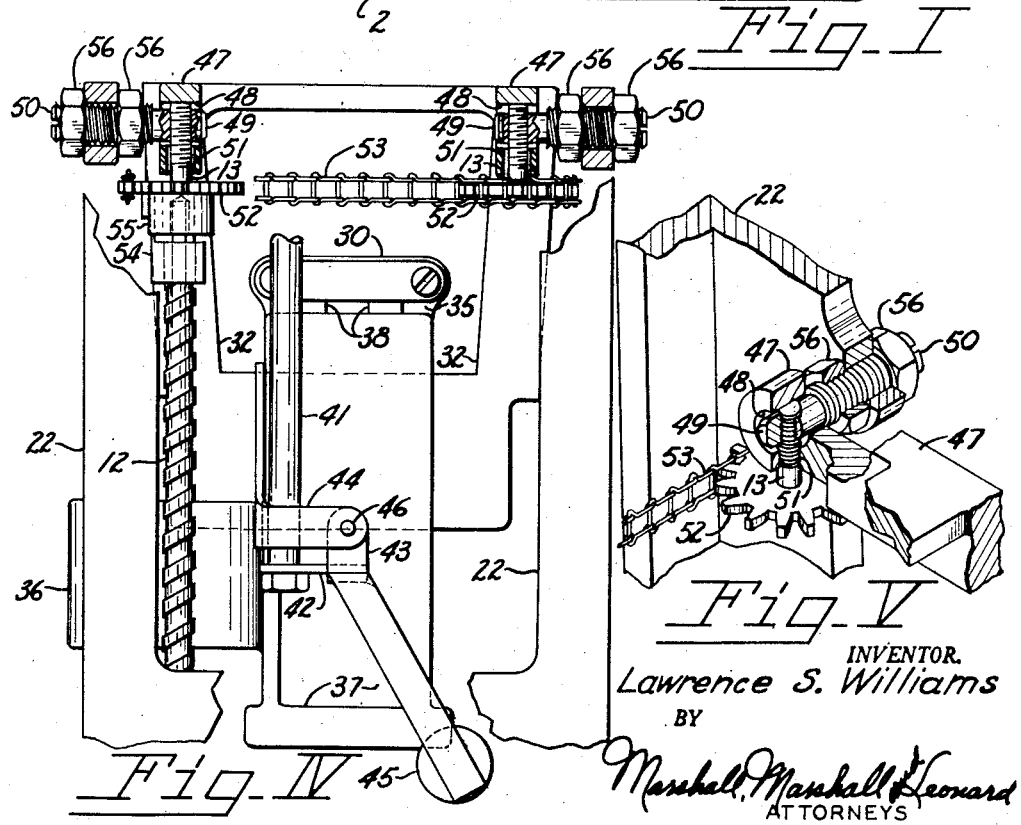
Fig. IV
Fig. V
INVENTOR.
Lawrence S. Williams
BY
Marshall, Marshall & Leonard
ATTORNEYS

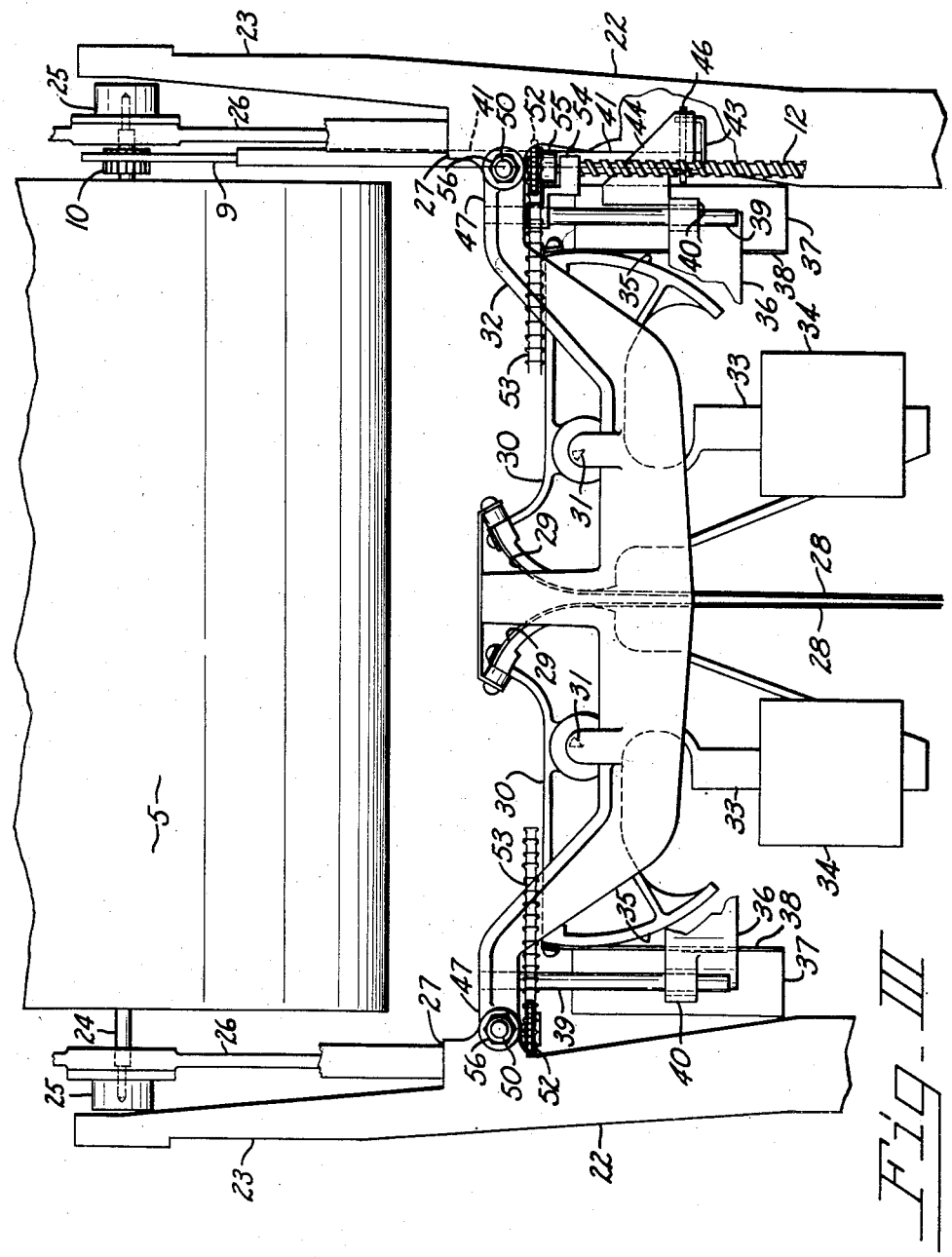

Patented June 26, 1951

2,558,162

UNITED STATES PATENT OFFICE 2,558,162

PENDULUM WEIGHING SCALE WITH TARE SETTING MEANS

Lawrence S. Williams, Toledo, Ohio, assignor to Toledo Scale Company, Toledo, Ohio, a corporation of New Jersey Application April 6, 1949, Serial No. 85,800

6 Claims. (Cl. 265—61)

This invention relates to cylinder type weighing scales and more particularly to an improved mechanism for varying the dimensional relation between a load counterbalancing mechanism and an indicating mechanism whereby the indication may be adjusted to indicate the net load on the scale.

Many weighing scales are provided with a tare beam in order that the weight of a container on a load receiver may be counterbalanced without having the weight of such container indicated on the dial mechanism of the scale. This common type of construction is not satisfactory if many weighings must be made and adjustment made for each weighing, because it is practically impossible for an operator to move the poise along the tare beam without disturbing the indication or condition of balance. This is because the poise is on a moving part of the weighing scale mechanism and any force applied to the poise other than directly along the pivot line of the lever disturbs the condition of balance. It is therefore necessary in setting off a tare load to move the poise to an approximate counterbalance position, to wait for the scale to come to rest, to note the indication and then to make another adjustment of poise position and again read the scale. This process is repeated until the proper position for the poise has been located.

In order to avoid such time consuming operations scales have been built employing a poise drive mechanism that moves the poise by forces directed along the pivot line of the lever. These devices are satisfactory as long as it is possible to provide a conveniently accessible tare beam and poise.

The ordinary cylinder scale as used for weighing and pricing commodities sold at retail in packages weighing up to 20 or 25 pounds is constructed in such a manner that it is practically impossible to add a tare beam and poise for offsetting the tare weight.

The principal object of this invention is to provide a simple mechanism for varying the dimensional relation between a pendulum counterbalancing mechanism and an indicia bearing chart so that variations in this relation may be employed to offset the indication of a tare load and to leave the weight of the net load in the container indicated on the chart.

Another object of the invention is to provide a simple mechanism for raising or lowering the pendulum frame of a weighing scale to effect changes in indication.

A more specific object of the invention is to provide a plurality of synchronously driven jack screws that support the pendulum frame and which by rotation raise or lower such frame.

More specific objects and advantages are apparent from the following description of a specific embodiment of the invention.

According to the invention the dimensional relation between a pendulum load counterbalancing mechanism and the axis of an indicia bearing chart is adjusted in order to offset the indication of a tare load. In a preferred form of the invention a pendulum frame of the scale is carried on jack screws so that it may be raised or lowered with respect to the frame of the scale to thereby cause a change in indication in such direction that the net load only is indicated on the chart.

More specific objects and advantages are apparent from the following description in which reference is made to the accompanying drawings.

In the drawings:

Figure I is a side elevation of a cylinder type weighing scale embodying the invention.

Figure II is a fragmentary perspective view of the control knob and adjacent end of a flexible drive shaft connecting the control knob to the jack screws.

Figure III is a front elevation of the load counterbalancing mechanism and a portion of the rotatable indicating chart showing the general location of the jack screws that support the pendulum load counterbalancing mechanism.

Figure IV is a fragmentary end elevation showing a portion of the frame and two of the jack screws which support one end of the pendulum frame.

Fig. V is a fragmentary perspective view with parts broken away to show the detailed construction of one of the jack screws and the parts of the pendulum frame and weighing scale frame cooperating therewith.

These specific figures and the accompanying description are intended merely to illustrate a preferred embodiment of the invention but not to limit the scope of the invention.

In the preferred embodiment a weighing scale comprises a load receiver 1 that is positioned over a low forwardly extending portion of a base 2 and that is supported by a lever system contained within such base but not shown in the drawings. A column 3, erected from the rear portion of the base 2, is surmounted by a generally circular portion 4 that houses an indicia bearing chart 5. The chart 5 may be viewed from the rear of the scale through windows provided in a plate 6. The chart 5 may be viewed from the front or load receiver side of the scale through magnifying lenses positioned in an adjustable lens housing 7 that is carried on a protruding portion 8 of the upper housing portion 4.

When loads applied to the load receiver 1 are counter-balanced by a pendulum mechanism contained within the column 3 the weighing movement of the pendulums raises a rack 9 through a distance that is proportional to the load. The rack 9 cooperates with a pinion 10 on the axis of the chart 5 to rotate the chart through an angle that is also proportional to the load. If it is desired to offset the indication of weight of an empty container placed on the load receiver 1 a tare control knob 11 is rotated and it, driving through a flexible shaft 12, rotates jack screws 13 serving to lower the pendulum mechanism as a whole thereby lowering the rack 9 through the same distance that the pendulums had originally raised it when the empty container was placed on the load receiver 1.

This relative motion between the pendulum frame and the frame of the scale is a simple way of returning the chart indication to zero to offset the weight of the empty container. In principle this system differs from the use of a tare beam because the pendulum counterbalancing mechanism always counterbalances the gross load (tare load plus net load) and the adjustment is made in the indicating mechanism drive to offset the indication of the tare load. With the conventional tare beam and poise the pendulum counterbalancing mechanism counterbalances the net load only while the tare load is counterbalanced by the beam and poise.

The construction of the drive knob 11 and its connection to the flexible shaft 12 is shown in Figure II. The end of the casing of the flexible shaft 12 is held in a socket formed in the end of a bushing 14 which bushing extends through and is anchored in a wall of the base 2 near the front right-hand corner of the scale. A sleeve 15 having a flange 16 at one end and a groove 17 near the other end is rotatably journaled in the bushing 14. The grooved end is further swedged to provide a rectangular bore that fits over a rectangular end portion 18 of the flexible shaft 12 thus securing the flexible shaft and the sleeve 15 against relative rotation. The control knob 11 is rotatably mounted on the end of the sleeve 15 and includes a pin 19 slidably journaled in a radial hole in the hub of the knob 11. A ring shaped spring 20 fitted over the hub engages a slot 21 in the head of the pin 19 and urges the pin radially against the sleeve 15. The innermost end of the pin engages the groove 17 with sufficient force to prevent disengagement of the knob 11 and to provide sufficient driving force to overcome the normal turning resistance of the jack screws 13. However, the grip of the knob 11 on the sleeve 15 is not tight enough to transmit damaging torque to the jack screws.

Referring now to Figure III the load counterbalancing and indicating mechanism contained within the column 3 and generally cylindrical upper portion 4 of the scale housing is supported on uprights 22 constituting part of the frame of the weighing scale. The uprights 22 include uuwardly extending arms 23 that serve to locate the housing 4. The chart 5 is carried on a shaft 24 which is journaled at its ends in ball bearings mounted within bearing cases 25 secured in chart assembly end frames 26 which in turn are mounted on shelves 27 of the scale end frames 22.

Load forces to be counterbalanced are transmitted from the lever system (not shown) to load ribbons 28 which are attached to a stirrup engaging the power pivot of the lever system and which at their upper ends overlie and are attached to power sectors 29 of pendulum bodies 30. The pendulum bodies 30 are provided with knife edge pivots 31 that rest in bearings mounted in a pendulum frame 32. Each of the pendulum bodies has a downwardly directed portion or stem having a track 33 to which a pendulum weight 34 is attached.

In addition each of the pendulum bodies 30 has a sector 35 that is concentric with respect to the edge of the knife edge pivot 31. A rack drive frame 36 having weight receivers 37 juxtaposed to the concentric sectors 35 is supported from the pendulum bodies 30 by steel ribbons 38 attached to the upper ends of the concentric sectors 35 and to the lower ends of the weight receivers 37. Pins 39 anchored in and extending downwardly from the pendulum frame 32 pass loosely through holes in ears 40 of the rack drive frame 36 to prevent excessive lateral displacement of the frame.

The power sectors 29 of the pendulum bodies 30 are circular and are eccentric with respect to the knife edge pivots 31. The amount of the eccentricity, the position of the center of gravity of the pendulum weights 34 and the weight of the rack drive frame 36 are selected so that the pendulums rotate through equal angles for equal increments of load applied to the power ribbons 28. Since the sectors 35 are concentric with respect to the knife edge pivots 31, the rack drive frame 36 is raised a distance that is exactly proportional to the load. This motion is used to drive the rack 9, the rack being carried in the upper end of a rack rod 41, the lower end of which is mounted on an arm 42 of a U-shaped carrier 43. The carrier 43 is pivotally supported between arms of a bracket 44 attached to one of the weight receivers 37 of the rack drive frame 36. The rack 9 and rack rod 41 are counterbalanced by a counterweight 45 which is of such magnitude and position that the composite center of gravity of the rack 9, rack rod 41 and balance weight 45 is located generally at the same elevation as pivot pin 46 carrying the carrier 43 from the bracket 44. The composite center of gravity is located slightly to the side of the pivot axis 46 so that there is a small component of force tending to hold the rack teeth in mesh with the pinion 10. By locating the composite center of gravity offset from but at the same elevation as the pivotal support for the rack the rack meshing pressure is not changed appreciably by small changes in the condition of level of the scale.

The pendulum frame 32 has arms 47 extending toward the frame uprights 22 and just below the shelves 27 of the frames. These arms 47 (see Figure IV) are bored horizontally to provide holes 48 that loosely receive tenon ends 49 of studs 50. The pendulum frame arms 47 also have vertical holes 51 from the lower sides of the arms and extending upwardly to intersect the axes of the larger holes 48. The jack screws 13 are a loose fit in the holes 51, are threaded through the vertical holes in the tenons 49 of the studs 50, and have their upper ends rounded to engage the upper sides of the holes 48 cut in the pendulum frame arms 47. This construction is clearly shown in Figure V. In this arrangement the pendulum frame 32 may be raised or lowered through a distance equal to the clearance between the outside diameter of the tenons 49 and the diameter of the holes 48.

Each of the jack screws 13 is provided with a sprocket 52 and these sprockets are in turn interconnected by a chain 53 so that the jack screws 13 may be rotated in unison and thus maintain the alignment of the pendulum frame 32 as it is raised or lowered.

Referring to Figures III and IV the flexible shaft 12 has its casing held in a bracket 54 supported from the pendulum frame 32 and has the end of its driving shaft engaged in a hub 55 of the sprocket 52 located at the front right-hand corner of the pendulum frame 32. Thus the drive from the knob 11 is through the flexible shaft 12 to the sprocket 52 and the jack screw 13 carrying this first sprocket and through the chain 53 and the other sprockets 52 to the remaining jack screws.

In order to secure free rotation of the jack screws 13 and also to secure proper relationship between the pendulum bodies 30 and the power pivot of the lever system of the scale it is necessary that the tenon studs 50 be individually adjustable and they are therefore each provided with a pair of lock nuts 56 which by selective tightening may be used to shift the pendulum frame 32 laterally as seen in Figure IV as well as to secure individual lateral adjustment of the jack screws 13 so that they accurately fit the vertical holes 51 in the arms 47.

It is sometimes desirable, according to the design of the scale, to slightly tilt the pendulum frame 32 as it is raised or lowered. If it is found desirable to do this the jack screws 13 may be provided with different pitch threads or the sprockets may be made with different numbers of teeth so as to secure the desired rates of tilt as the frame is moved up or down. Whether or not various pitches of screw threads are required depends upon the geometrical relationship between the lever of the scale and the power ribbons 28 as the lever rocks through its travel according to the load being counterbalanced.

The jack screws 13 and the drive therefor illustrated in the drawings are intended to illustrate one simple mechanism for accomplishing the dimensional adjustment between a pendulum load counterbalancing mechanism and an indicating chart. However, the result to be accomplished according to the invention is the adjustment in distance between the pendulum counterbalancing mechanism and the indicating chart shaft whether such adjustment is effected by moving the pendulum frame with respect to the remainder of the scale mechanism or whether it is effected by moving some other portion of the weighing scale mechanism. In any event the pendulum mechanism must be adjusted to secure a precisely linear relationship between load and indication of load since according to the adjustment various portions of pendulum travel are caused to selectively cooperate with different portions of indicator chart travel. It is therefore necessary that all portions of both indicator travel and pendulum travel be correspondingly linear. This result is accomplished in this mechanism by designing the pendulums so that they are accurately linear through the entire movement employed in counterbalancing the gross load.

Various machanisms may be employed to adjust the relative distance between the pendulum counterbalancing mechanism and the indicator chart shaft without departing from the spirit and scope of the invention that provides tare adjustment by varying this relative spacing of counterbalancing and indicating mechanisms.

Having described the invention, I claim:

1. In a weighing scale having a pendulum load counterbalancing mechanism, in combination, a first frame carrying the pendulum load counterbalancing mechanism, a second frame carrying indicating means, supports for said frames, a driving connection between the load counterbalancing mechanism and the indicating means, and an elevating mechanism included in the support for one of the frames for varying the spacing between the frames.

2. In a weighing scale having a pendulum load counterbalancing mechansim, in combination, a support, a frame carrying indicating means, a second frame carrying the pendulum load counterbalancing mechanism, a driving connection between the load counterbalancing mechanism and the indicating means, and a plurality of jack screws for supporting the second frame from the support.

3. In a weighing scale having a pendulum load counterbalancing mechanism, in combination, a frame carrying indicating means, a second frame carrying the pendulum load counterbalancing mechanism, a driving connection between the load counterbalancing mechanism and the indicating means, elevating mechanism for supporting one of the frames, and a flexible shaft for driving the elevating mechanism from an accessible control member.

4. In a weighing scale having a pendulum load counterbalancing mechanism, in combination, a frame carrying indicating means, a second frame carrying the pendulum load counterbalancing mechanism, a driving connection between the load counterbalancing mechanism and the indicating means, a plurality of jack screws for supporting one of the frames, and a chain for interconnecting the jack screws, whereby the screws are synchronized and the frame maintained in alignment as it is raised or lowered.

5. In a weighing scale having a pendulum load counterbalancing mechanism, in combination, a frame carrying indicating means, a second frame carrying the pendulum load counterbalancing mechanism, a driving connection between the counterbalancing mechanism and the indicating means, a plurality of jack screws for supporting the pendulum frame, a sprocket on each jack screw, and a chain for interconnecting the sprockets, whereby the frame is held in alignment as it is raised or lowered.

6. In a weighing scale having a pendulum load counterbalancing mechanism, in combination, a frame carrying indicating means, a second frame carrying the pendulum load counterbalancing mechanism, a driving connection between the counterbalancing mechanism and the indicating means, a plurality of jack screws for supporting the pendulum frame, a sprocket on each jack screw, a chain interconnecting the sprockets, and a flexible shaft extending from an accessible position and engaging one of the sprockets for driving the jack screws.

LAWRENCE S. WILLIAMS.

No references cited.